US012780729B2

(12) United States Patent
Niroumand et al.

(10) Patent No.: US 12,780,729 B2
(45) Date of Patent: Nov. 3, 2026

(54) METHOD OF PRODUCTION OF A GROUT AND A GROUTING METHOD

(71) Applicants: Hamed Niroumand, Tehran (IR); Lech Bałachowski, Gdańsk (PL)

(72) Inventors: Hamed Niroumand, Tehran (IR); Lech Bałachowski, Gdańsk (PL)

( * ) Notice: Subject to any disclaimer, the term of this patent is extended or adjusted under 35 U.S.C. 154(b) by 384 days.

(21) Appl. No.: 18/412,598

(22) Filed: Jan. 14, 2024

(65) Prior Publication Data

US 2025/0230093 A1 Jul. 17, 2025

(51) Int. Cl.

| | |
|---|---|
| ***C04B 7/52*** | (2006.01) |
| ***B28C 1/00*** | (2006.01) |
| ***B28C 1/06*** | (2006.01) |
| ***B28C 7/02*** | (2006.01) |
| ***C04B 40/00*** | (2006.01) |
| ***C04B 111/70*** | (2006.01) |

(52) U.S. Cl.

CPC ................ *C04B 7/52* (2013.01); *B28C 1/006* (2013.01); *B28C 7/026* (2013.01); *C04B 40/0032* (2013.01); *B28C 1/06* (2013.01); *C04B 2111/70* (2013.01)

(58) Field of Classification Search

CPC ... C04B 7/52; C04B 40/0032; C04B 2111/70; C04B 28/02; C04B 2111/00008; B28C 1/006; B28C 7/026; B28C 1/06; B28C 5/003

See application file for complete search history.

(56) References Cited

U.S. PATENT DOCUMENTS

| | | | | |
|---|---|---|---|---|
| 4,493,592 | A | 1/1985 | Knox | |
| 4,902,170 | A | 2/1990 | Knox et al. | |
| 12,428,603 | B2 * | 9/2025 | Niroumand | C09K 17/10 |
| 2010/0193982 | A1 * | 8/2010 | Genolet | C09K 8/46 106/713 |
| 2024/0318080 | A1 * | 9/2024 | Niroumand | C09K 17/10 |

FOREIGN PATENT DOCUMENTS

| | | | |
|---|---|---|---|
| CN | 102079863 | A | 6/2011 |
| CN | 114573270 | A | 6/2022 |

* cited by examiner

*Primary Examiner* — Pamela H Weiss

(74) *Attorney, Agent, or Firm* — Andrzej Malarz, Esq.

(57) ABSTRACT

A method of a nano-grout fabrication comprises the steps of: a) acquiring a batch cement for a ball mill, b) forming in the ball mill a cement powder also called a nano-cement powder, c) pouring the nano-cement powder obtained in step b) to a rotary mixer, d) adding water to the rotary mixer, e) mixing the water and the nano-cement powder until a homogenous mixture of the nano-grout or the nano- slurry is obtained, f) pouring the nano-grout or the nano-slurry obtained in step e) from the rotary mixer to a distributing device, where a grouting material is applied to the prepared construction site or specific places of the construction site and is subjected to curing for a predetermined amount of time.

12 Claims, 4 Drawing Sheets

METHOD OF PRODUCTION OF A GROUT AND A GROUTING METHOD

BACKGROUND OF THE INVENTION

Field of the Invention

The present disclosure generally relates to materials engineering, and more particularly to a method of grouting using a modified grout (so called nano-grout and nano-slurry).

Brief Description of the Background of the Invention Including Prior Art

Grouting is a process of injecting a fluid or paste-like material into cracks, voids, or pores in soil or rock to fill them and enhance their strength, stability, or impermeability, which is often desired in various engineering fields, such as geotechnical engineering, ground improvement, civil engineering, environmental engineering, building industry, and oil and gas engineering. The performance of the grouting process depends mostly on the grouting material used. The particles or materials should have high surface area, high reactivity, high dispersibility, and high compatibility with the grout matrix. The grouting material should also be able to modify the rheological, mechanical, chemical, and durability properties of the grout matrix in a desirable way. Moreover, the grouting material should be able to penetrate into fine cracks, voids, or pores in the soil or rock and form a strong bond with them. Desirably, the grouting material should also be environmentally friendly and safe to handle and use.

Grout is a material that is used to fill the cracks, voids, or honeycombs in concrete or masonry structures. It is injected under pressure to ensure that it penetrates deeply and completely into the damaged areas. Grout can be of different types, depending on the purpose and application of injection grouting. Some common types of grout are:

- Epoxy resin: This is a rigid and strong material that can bond well with concrete and provide structural strength. It is suitable for dry and slightly damp conditions.
- Polyurethane resin: This is a flexible and elastic material that can seal active leaks and accommodate movements. It is suitable for wet and moist conditions.
- Cement-based grout: This is a low-cost and widely available material that can fill large voids and gaps. It is suitable for non-structural repairs.
- Acrylic resin: This is a low-viscosity and fast-setting material that can penetrate fine cracks and seal water ingress. It is suitable for damp and wet conditions.
- High molecular weight methacrylate (HMWM): This is a low-viscosity and UV-resistant material that can improve the durability and skid resistance of concrete surfaces. It is suitable for dry and slightly damp conditions.

Grouting cement is a type of grout that is made of cement, water, and sometimes sand or other additives. Grout is a fluid material that can fill gaps, cracks, or voids in concrete, masonry, or soil structures. Grouting cement is used for various purposes, such as:

- Underpinning: This is a process of strengthening the foundation of an existing structure by injecting grout under pressure into the soil or rock beneath it. This can improve the bearing capacity, stability, and settlement of the foundation.

- Soil stabilization: This is a process of improving the engineering properties of the soil, such as strength, stiffness, and permeability, by injecting grout into the soil pores or fractures. This can prevent soil erosion, liquefaction, or collapse.
- Concrete repair: This is a process of restoring the integrity and durability of damaged concrete structures by injecting grout into the cracks or honeycombs. This can enhance the bond strength, load transfer, and corrosion resistance of the concrete.
- Waterproofing: This is a process of preventing water leakage or seepage through concrete or masonry structures by injecting grout into the joints or openings. This can reduce the risk of water damage, mold growth, or deterioration of the structures.

Grouting cement can be classified into different types based on the composition, consistency, and application method of the grout. Some common types of grouting cement are:

- Non-shrink grout: This is a type of grout that does not shrink or crack after hardening. It is used for filling large gaps or voids where high strength and durability are required.
- Flowable grout: This is a type of grout that has a low viscosity and can flow easily into narrow spaces or irregular shapes. It is used for filling small cracks or crevices where high fluidity and penetration are required.
- Thixotropic grout: This is a type of grout that has a high viscosity and can resist sagging or dripping when applied vertically or overhead. It is used for sealing vertical or inclined joints or openings where high adhesion and cohesion are required.
- Expansive grout: This is a type of grout that expands slightly after hardening. It is used for creating pressure or tension in the surrounding structures where high contact and load transfer are required.

U.S. Pat. No. 4,902,170A discloses An improved grouting method and arrangement using particulate material and aqueous solutions of alkali silicate materials confined between pile seal assembly and top of an offshore platform in sealing the annular space formed between either a jacket leg or pile sleeve and a pile driven therethrough or similar annular space of an offshore platform to support a column of grout thereon so that the annular space may ultimately be filled with grouting material.

Document CN102079863A discloses a single-component hydrophilic polyurethane grouting material, a raw material and a preparation method thereof, wherein the raw material of the single-component hydrophilic polyurethane grouting material comprises the following components: 100 parts by weight of hydroxyl-terminated polyether; 30-150 parts by weight of isocyanate; 10-60 parts by weight of a plasticizer; 1-4 parts by weight of a foam stabilizer. The single-component hydrophilic polyurethane grouting material disclosed by the invention keeps the characteristics of single-component grouting, quick reaction and water stop when meeting water and the like of the conventional hydrophilic polyurethane grouting material, adopts a one-step prepolymerization process, abandons the use of volatile organic solvents and harmful isocyanate compounds which are easy to remain, effectively reduces the production cost and simultaneously improves the environmental protection performance of the product.

U.S. Pat. No. 4,493,592A discloses a method of grouting using aqueous solutions of alkali silicate materials in sealing the annular space formed between either a jacket leg or pile sleeve and a pile driven therethrough of an offshore platform, or other similar annular space, to support a column of grout thereon.

Document CN114573270B discloses a nano silicon dioxide suspension which is prepared by mixing the following components in parts by weight: 1 part of silica nano particles, 0.1 to 0.5 part of water reducer, 0.1 to 0.5 part of coupling agent, 0.01 to 0.03 part of calcium hydroxide and 5 to 20 parts of water. The invention also discloses a preparation method of the nano silicon dioxide suspension, which comprises the following steps: firstly, carrying out high-temperature activation treatment on the silicon dioxide nano particles: heating to 300-350° C. for calcination, heating to 900-950° C. for calcination, and naturally cooling to room temperature; and sequentially adding the water reducer, the coupling agent and the calcium hydroxide into the water with the formula amount, uniformly stirring, then adding the activated silica nano particles into the water, and uniformly stirring to obtain the nano silica suspending agent. The invention finally discloses application of the nano silicon dioxide suspension serving as a modifier in cement-based grouting materials.

Nanogrouting or nano-grouting is a term that refers to the use of nanomaterials, such as nanocement, nanosilica, nanoclay, or nanocellulose, to enhance the performance of grouting materials. Grouting is a process of injecting a fluid material, such as cement, resin, or clay, into cracks, voids, or pores in soil, rock, or concrete structures. Nanogrouting can improve the properties of grouting materials, such as viscosity, fluidity, setting time, strength, durability, and anti-scouring ability. Nanogrouting can also increase the penetration and filling ability of grouting materials into fine cracks or crevices. Nanogrouting can be used for various purposes, such as sealing water leaks, stabilizing soil, repairing concrete, or strengthening foundations.

Nanogrouting is a relatively new and innovative technique that has been applied in some engineering fields, such as petroleum engineering, groundwater protection engineering, ground improvement, tunnel construction, nuclear waste storage, and liquefiable soil improvement. Nanogrouting can provide some advantages over conventional grouting methods, such as:

- Reducing the environmental impact: Nanogrouting can use less water and cement than conventional grouting methods. Nanogrouting can also use eco-friendly nanomaterials that are biodegradable and nontoxic.
- Enhancing the efficiency and effectiveness: Nanogrouting can reduce the cost and time of grouting operations by using less material and achieving faster setting and curing. Nanogrouting can also improve the quality and reliability of grouting results by creating stronger and more durable bonds with the surrounding structures.
- Expanding the application range: Nanogrouting can overcome some limitations of conventional grouting methods, such as low injectability, high viscosity, poor adhesion, or low resistance to dynamic loads. Nanogrouting can also adapt to different geological conditions, such as dry, wet, or moist environments.

Nanogrouting is a term that refers to the use of nano-sized particles or materials to improve the properties and performance of grouting materials. Grouting is a process of injecting a fluid or paste-like material into cracks, voids, or pores in soil or rock to fill them and enhance their strength, stability, or impermeability. Nano-grouting can be applied to various engineering fields, such as geotechnical engineering, ground improvement, civil engineering, environmental engineering, and oil and gas engineering.

Some features essential for the invention of nanogrouting are:

- The nano-sized particles or materials should have high surface area, high reactivity, high dispersibility, and high compatibility with the grout matrix.
- The nano-sized particles or materials should be able to modify the rheological, mechanical, chemical, and durability properties of the grout matrix in a desirable way.
- The nano-sized particles or materials should be able to penetrate into fine cracks, voids, or pores in the soil or rock and form a strong bond with them.
- The nano-sized particles or materials should be environmentally friendly and safe to handle and use.

Some examples of nano-sized particles or materials that can be used for nano-grouting are:

- Nanocement: This is a solution or suspension of nano-sized cement particles that can improve the fluidity, pumpability, setting time, and compressive strength.
- Nano silica sol: This is a colloidal solution of nano-sized silica particles that can improve the fluidity, pumpability, setting time, compressive strength, and anti-scour performance of cement-based grouts.
- Nano calcium carbonate: This is a nano-sized form of calcium carbonate that can enhance the hydration, strength development, and durability of cement-based grouts.
- Nano clay: This is a nano-sized form of clay minerals that can increase the viscosity, gelation, and thixotropy of grouts.
- Nano carbon: This is a nano-sized form of carbon materials such as carbon nanotubes, graphene, and carbon black that can improve the electrical conductivity, thermal conductivity, strength, and toughness of grouts.

Existing grouting methods depend on the use of grouting materials of relatively high particle size, which leads to the low surface area and therefore, the material lacks performance in grouting applications, especially when the application site consists of fine and complex target substrate. Often, the commercially available grouting methods include grouting materials which exchange good grouting performance over environmental impact and human health threat, which is not desirable.

As explained above, there is a need for a modified nano-grout and nano-slurry, and also for the grouting method with use of the nano-grout and nano-slurry, being both cost-effective and environmentally friendly, while also performing well in difficult applications, according to the needs of a given construction project.

SUMMARY OF THE INVENTION

Purposes of the Invention

It is an object of the present invention to provide a grout and grouting method overcoming the above mentioned issues present in the prior art in the related field of grouting applications.

These and other objects and advantages of the present invention will become apparent from the detailed description, which follows.

Brief Description of the Invention

The present invention relates to a grouting method using a nano-sized particles or materials to improve the properties and performance of grouting materials.

The object of the invention is to provide a method for production of a grout, in this description also called a nano-grout and nano-slurry, comprising the steps of:

a) acquiring a batch cement for a ball mill, b) forming in the ball mill a cement powder, wherein forming of the cement powder is performed by grinding the batch cement in the ball mill, wherein the ball mill includes a plurality of mill balls, wherein the average particle size of the produced cement powder is between 2 nm and 100 nm, and as such is also called a nano-cement powder, c) pouring the cement powder or the nano-cement powder obtained in step b) to a rotary mixer, d) adding water to the rotary mixer containing the cement powder or the nano-cement powder produced in step b), wherein a weight ratio of the water and the cement powder or the nano-cement powder is from 1:100 to 10:100 (nano-cement powder:water), e) mixing the water and the cement powder or the nano-cement powder for a period of time T from 10 minutes to 120 minutes until a homogenous mixture of the nano-grout or the nano-slurry is obtained, wherein a rotational speed of the rotary mixer is between 70 rpm and 120 rpm, f) pouring the grout or the nano-grout or the nano-slurry obtained in step e) from the rotary mixer to a distributing device. Preferably, the weight ratio of the batch cement to the plurality of the mill balls is between 1:05 and 1:30 wt/wt. Preferably, the ball mill is configured to rotate at a rotational speed between 600 rpm and 4200 rpm. Preferably, the batch cement is selected from any commercial cement available on the market.

The object of the invention is also to provide a grouting method, comprising the steps of:

a) preparing the construction site for the grouting application, b) applying a grouting material to the construction site or specific places of the construction site, c) curing the applied grouting material for a predetermined amount of time, wherein the grouting material is the grout or nano-grout or nano-slurry obtained according to claim 1. Preferably, the reactivity of the nano-grout is between 0.99 and 11 min Preferably, the dispersibility of the nano-grout is between 0.009 and 0.12 Pa-s. Preferably, the nano-grout includes carbon nano-tubes and/or graphene and/or carbon black and/or nano silica sol and/or nano calcium carbonate and/or nano clay and/or nano carbon. Preferably, the particles of the grout or the nano-grout have an average surface area of 150-380 $m^2$/g. Preferably, a dispersibility of the particles of the nano-grout is between 0.009 and 0.12 Pa-s. Preferably, the particles of the nano-grout have high compatibility with the grout matrix. Preferably, the nano-grout includes an accelerator selected from a group consisting of: calcium chloride, sodium silicate, sodium hydroxide.

BRIEF DESCRIPTION OF THE DRAWINGS

These aims together with other objects and advantages which will become subsequently apparent reside in the details of the construction and operation as more fully hereinafter described and claimed, reference being made to the accompanying drawings forming a part hereof, wherein the same numerals refer to the same parts throughout.

In drawings

DETAILED DESCRIPTION OF INVENTION AND PREFERRED EMBODIMENT

Figure 1:
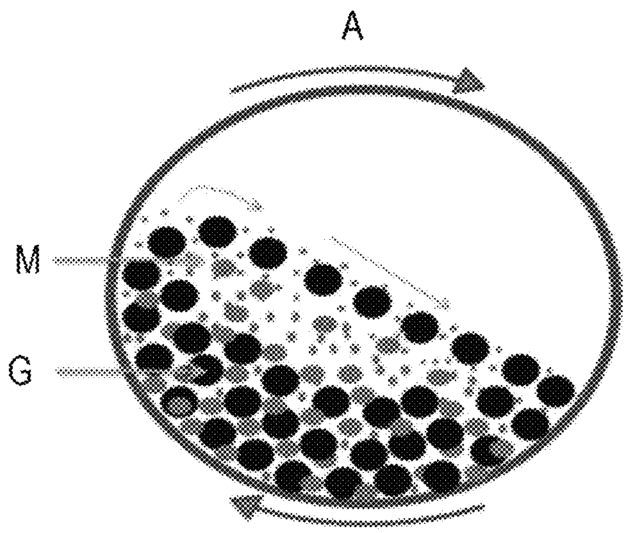
FIG. 1 illustrates schematically the work principle of the ball mill for the nano-grout production.
Figure 2:
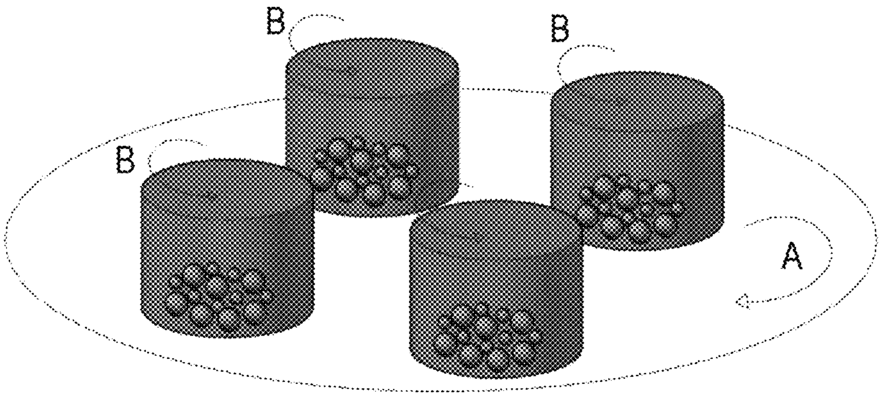
FIG. 2 illustrates schematically the work principle of another embodiment of the ball mill.

Referring to the drawing, FIG. 1 shows schematically a principle of operation of a ball mill (not claimed). The ball mills are well known, therefore the construction will be not described here in details. However, operating parameters of the ball mill, for example the size and material of the balls, the weight ratio of the balls to the batch cement, rotational speed of the ball mill cylinder, inclination of the rotational axis, time of operating, etc., are changeable and are to be set according to the requirements of the output material (the nano-cement). It can be seen on FIG. 1 that during operation, the ball mill cylinder rotates according to the direction of the arrow A. The crushing medium G, which includes a plurality of metal balls of sizes 1 cm, 1.5 cm and 2 cm, rotate inside the cylinder around an axis. The bottom plate of the device and the cylinders containing the material to be grinded and/or crushed and/or shredded which is the batch cement, M, rotate around an axis perpendicular to each other in opposite directions (one clockwise and the other counterclockwise). These movements are creating a centrifugal force. The balls first are pressed to a wall of the cylinder due to the centrifugal force caused by the rotational motion of the chamber and then the centrifugal force caused by the rotational motion of the plate dominates the force and, the balls in the cylinder are falling on the batch cement material particles in a specific position due to the gravity and are causing them to crush and ultimately convert the particles to nano size. The wording “nano size” or “nano-grout” in this description means a size from around 2 nm to around 100 nm (nanometers). In simpler terms, these methods are among the methods in which by crushing and shredding larger materials and particles into smaller particles and continuing this process to the size of nanometers, they become nanoparticles, which means a particles with the average nano size, in general in diameter of the majority of the particles, as described above. The particle size of the batch cement may determine the degree of purity, the shape of the material particles and the degree of quality of the grout or nano-grout. Another construction of the ball mill (not claimed) is shown on FIG. 2. This planetary ball mill includes a number of ball mill cylinders (grinding jars) which are rotatably placed on an independently rotatable base plate. The directions of rotation B of the grinding jars and the directions of rotation A of the base plate are opposite. The grinding balls in the grinding jars are subjected to superimposed rotational movements, the so-called Coriolis forces. The difference in speeds between the balls and grinding jars produces an interaction between the frictional and the impact forces, which releases high dynamic energies. The interplay between these forces produces the high and very effective degree of size reduction of the planetary ball mill. In the next step the grout powder or the nano-grout powder obtained in the previous step is poured to a rotary mixer, where in the next step water is added, wherein the weight ratio of the water and the grout powder or the nano-grout powder is 1:100 and 10:100 (nano-cement powder:water). The water and the grout powder or the nano-grout powder is mixed for a period of time T 10 minutes with rotational speed of the rotary mixer 200 rpm. After this time a homogenous mixture of the grout, also called nano-grout or nano-slurry, is obtained. Next the grout or the nano-grout or the nano-slurry is poured from the rotary mixer to a distributing device (not claimed). Depending on the application, the distributing device can be a pump, a syringe, a nozzle, or a spray gun. The weight ratio of the batch cement to the plurality of the mill balls is 1:2 wt/wt. The rotational speed of the ball mill is set for 400 rpm.

Some specific examples (embodiments) of nano-grouting are:

Water-blocking nano-composite cement-based grouting materials: This is a type of nano-grouting that uses a mixture of ordinary Portland cement, sulfoaluminate cement, water-reducing agent, early strength agent, nano silica sol, and cellulose to create a grout that has good fluidity, pumpability, setting time, compressive strength, and anti-scour performance. This grout can be used for water blocking and reinforcement in underground engineering construction such as hydropower projects, mines, tunnels, etc.

Silica sol as grouting material: This is a type of nano-grouting that uses colloidal solutions of nano-sized silica particles to create a grout that has low viscosity, high penetration, and high strength. This grout can be used for permeation grouting of rock to prevent the leakage of water into tunnels and hard rocks. The gelling time and strength development of this grout can be controlled by adding different salt solutions such as NaCl and KCl.

Nano-composite cement: This is a type of nano-grouting that uses a mixture of cement, fly ash, water-reducing agent, early strength agent, and nano-materials such as nano silica sol, nano calcium carbonate, nano clay, and nano carbon to create a grout that has improved fluidity, setting time, hydration, strength development, and durability. This grout can be used for stabilization of loose sands and improvement of soil properties.

Figure 3:
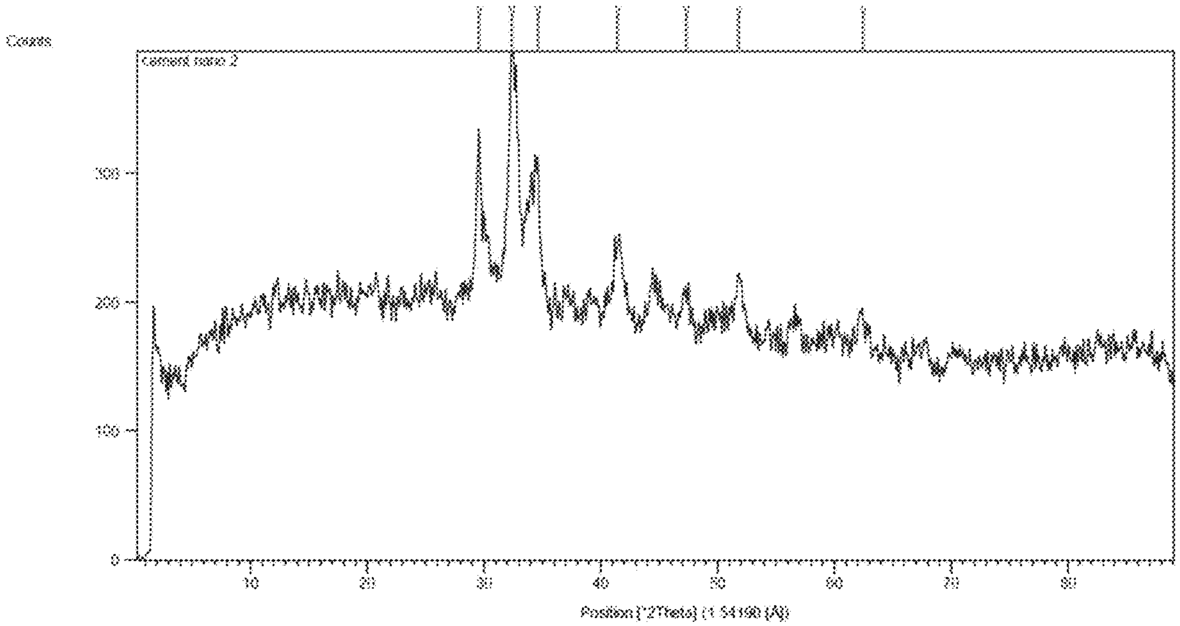
FIG. 3 illustrates a XRD diagram before the nano-grout production process, consistent with one or more exemplary embodiments of the present disclosure.
Figure 4:
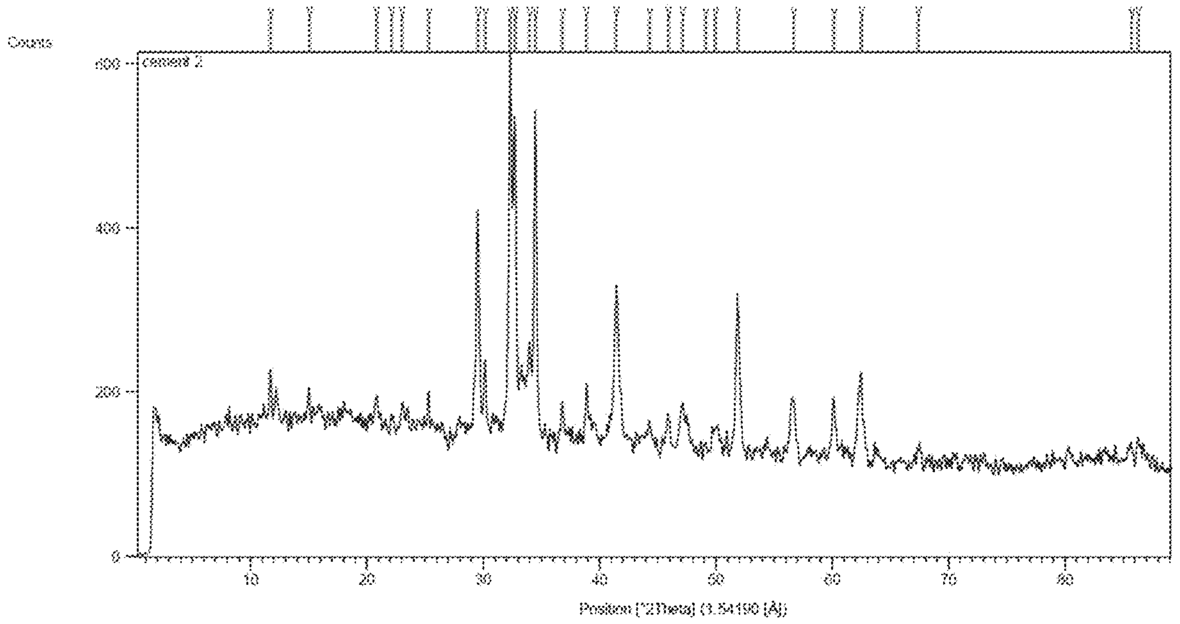
FIG. 4 illustrates a XRD diagram after the nano-grout production process, consistent with one or more exemplary embodiments of the present disclosure.

FIG. 3 and FIG. 4 shows the results of the XRD experiments. The nano-grout particles, respectively, are after the production process. The results of the XRD test are presented before and after the procedure. The X-ray diffraction (XRD) is a versatile non-destructive analytical technique used to analyze physical properties such as phase composition, crystal structure and orientation of the powder, the solid and the liquid samples. These figures show the crystallographic structure of the solid particles of the grout.

Figure 5:
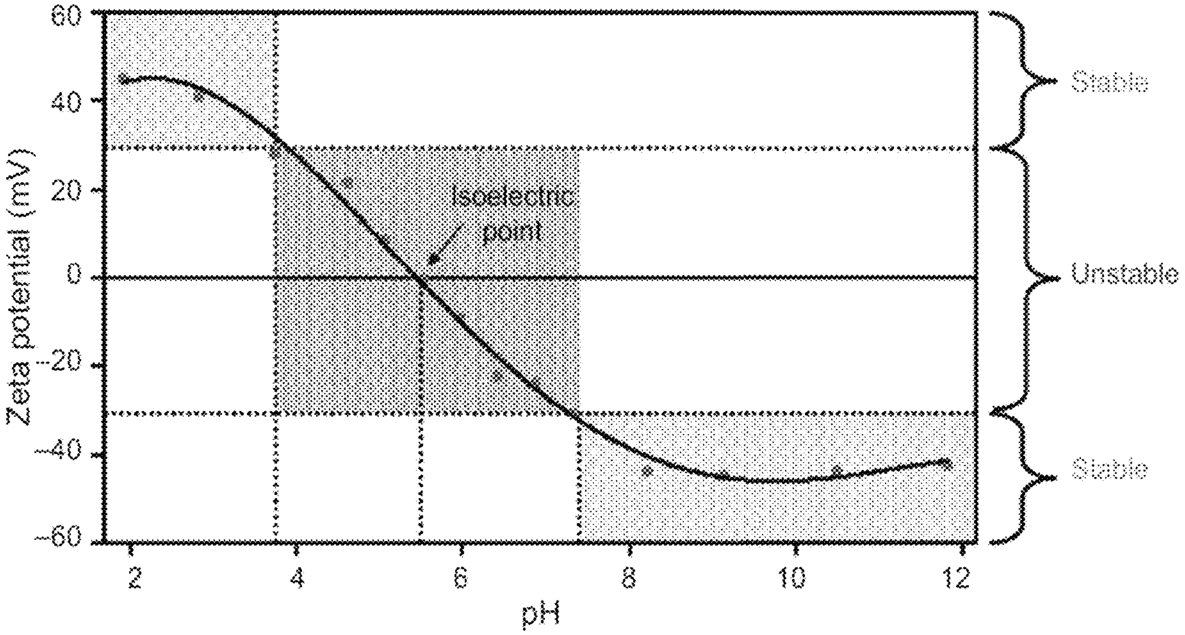
FIG. 5 illustrates a Zeta analysis for the nano-cement.
Figure 6:
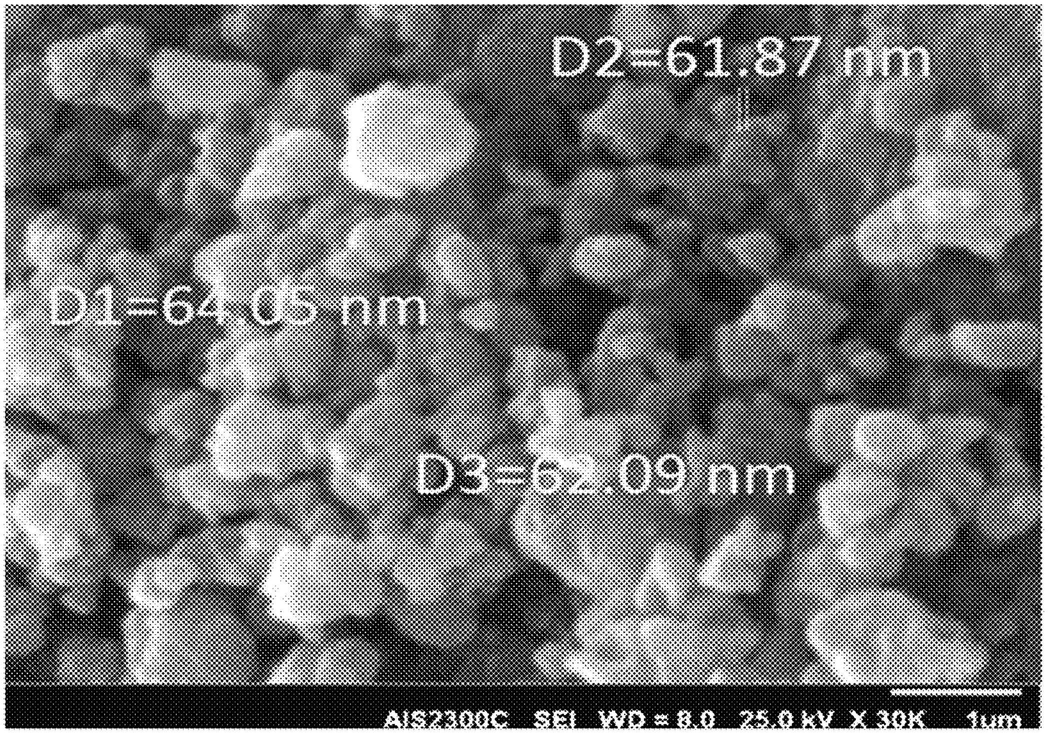
FIG. 6 illustrates an Scanning Electron Microscope (SEM) image of the nano-grout particles.
Figure 7:
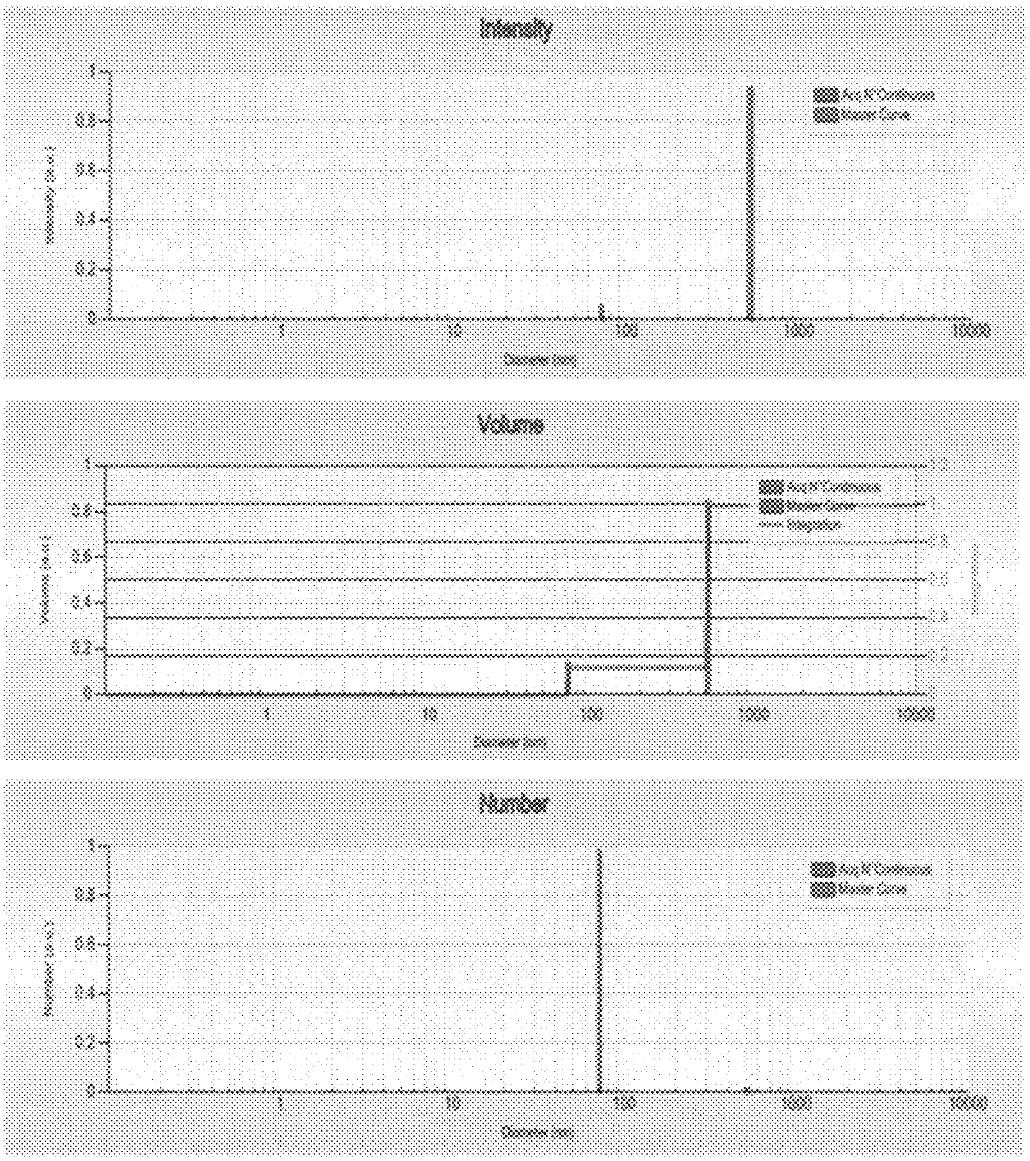
FIG. 7 illustrates a DLS results with Pade Laplace Dispersion Technique for Nano Slurry.

The results of the XRD test after the process are as follows: According to the presented results, the peak points in the whole nano production process have been constant, which shows that no additional material in the nano production process has been added to the nano-grout. Also, the results of XRD test on the sample before and after the nano-production process show that no changes have occurred in the powder components. FIG. 5 illustrates a zeta analysis for the nano-grout. The magnitude of the zeta potential gives an indication of the potential stability of the colloidal system. If all the particles in suspension have a large negative or positive zeta potential then they will tend to repel each other and there will be no tendency for the particles to come together. The result of the analysis indicated on FIG. 5 is that in the range from 30 to 60 mV and from −30 to −60 mV the zeta potential is stable, but in the range from −30 to 30 mV the zeta potential is unstable. FIG. 6 illustrates a Scanning Electron Microscope (SEM) images of the solid grout particles after the process of nano-production. As shown, the measured sizes of three chosen particles are 61.87 nm, 64.05 nm and 62.09 nm, respectively. FIG. 7 illustrates a Dynamic light scattering (DLS) size distributions of nano slurry samples obtained by using the Pade Laplace dispersion technique. The Pade Laplace method is a high-resolution inversion algorithm that can resolve multimodal distributions and account for polydispersity. The nano slurry samples consist of nanoparticles suspended in a liquid medium. The DLS technique measures the intensity fluctuations of scattered light due to the Brownian motion of the nanoparticles and infers their size distribution.

Nanogrouting provides some advantages over conventional grouting methods, such as:

Reducing the environmental impact: Nanogrouting can use less water and cement than conventional grouting methods. Nanogrouting can also use eco-friendly nanomaterials that are biodegradable and nontoxic.

Enhancing the efficiency and effectiveness: Nanogrouting can reduce the cost and time of grouting operations by using less material and achieving faster setting and curing. Nanogrouting can also improve the quality and reliability of grouting results by creating stronger and more durable bonds with the surrounding structures.

Expanding the application range: Nanogrouting can overcome some limitations of conventional grouting methods, such as low injectability, high viscosity, poor adhesion, or low resistance to dynamic loads. Nanogrouting can also adapt to different geological conditions, such as dry, wet, or moist environments.

In describing a preferred embodiment of the invention, specific terminology is resorted to for the sake of clarity. However, the invention is not intended to be limited to the specific terms so selected, and it is to be understood that each specific term includes all technical equivalents which operate in a similar manner to accomplish a similar purpose.

What is claimed is:

1. A method for production of a grout, comprising the steps of:

a) acquiring a batch cement for a ball mill, b) forming in the ball mill a cement powder, wherein forming of the cement powder is performed by grinding the batch cement in the ball mill, wherein the ball mill includes a plurality of mill balls, wherein the average particle size of the produced cement powder is between 2 nm and 100 nm, and as such is also called a nano-cement powder, c) pouring the cement powder or the nano-cement powder obtained in step b) to a rotary mixer, d) adding water to the rotary mixer containing the cement powder or the nano-cement powder produced in step b), wherein a weight ratio of the water and the cement powder or the nano-cement powder is from 1:100 to 10:100.

e) mixing the water and the cement powder or the nano-cement powder for a period of time T from 10 minutes to 120 minutes until a homogenous mixture of the nano-grout or the nano-slurry is obtained, wherein a rotational speed of the rotary mixer is between 70 rpm and 120 rpm, f) pouring the grout or the nano-grout or the nano-slurry obtained in step e) from the rotary mixer to a distributing device.

2. The method according to claim 1, wherein the weight ratio of the batch cement to the plurality of the mill balls is between 1:05 and 1:30 wt/wt.

3. The method according to claim 1, wherein the ball mill is configured to rotate at a rotational speed between 600 rpm and 4200 rpm.

4. The method according to claim 1, wherein the batch cement is selected from any commercial cement available on the market.

5. A grouting method, comprising the steps of:

a) preparing the construction site for the grouting application, b) applying a grouting material to the construction site or specific places of the construction site, c) curing the applied grouting material for a predetermined amount of time, wherein the grouting material is the nano-grout or the nano-slurry obtained according to claim 1.

6. The grouting method according to claim 5, wherein the reactivity of the nano-grout is between 0.99 and 11 min.

7. The grouting method according to claim 5, wherein the dispersibility of the nano-grout is between 0.009 and 0.12 Pa-s.

8. The grouting method according to claim 5, wherein the nano-grout includes carbon nano-tubes and/or graphene and/or carbon black and/or nano silica sol and/or nano calcium carbonate and/or nano clay and/or nano carbon.

9. The grouting method according to claim 5, wherein the particles of the nano-grout have an average surface area of 150-380 $m^2/g$.

10. The grouting method according to claim 5, wherein the dispersibility of the particles of the nano-grout is between 0.009 and 0.12 Pa-s.

11. The grouting method according to claim 5, wherein the particles of the nano-grout have high compatibility with the grout matrix.

12. The grouting method according to claim 5, wherein the nano-grout or nano-slurry includes an accelerator selected from a group consisting of: calcium chloride, sodium silicate, sodium hydroxide.

* * * * *